(12) United States Patent
Ritter et al.

(10) Patent No.: US 9,341,463 B2
(45) Date of Patent: May 17, 2016

(54) MEASURING SYSTEM

(71) Applicant: Micronas GmbH, Freiburg (DE)

(72) Inventors: Joachim Ritter, Loerrach (DE); Joerg Franke, Freiburg (DE)

(73) Assignee: Micronas GmbH, Freiburg (DE)

( * ) Notice: Subject to any disclaimer, the term of this patent is extended or adjusted under 35 U.S.C. 154(b) by 86 days.

(21) Appl. No.: 14/154,752

(22) Filed: Jan. 14, 2014

(65) Prior Publication Data

US 2014/0197820 A1 Jul. 17, 2014

(30) Foreign Application Priority Data

Jan. 14, 2013 (DE) .......... 10 2013 000 430

(51) Int. Cl.
*G01B 7/14* (2006.01)
*G01D 5/14* (2006.01)

(52) U.S. Cl.
CPC . *G01B 7/14* (2013.01); *G01D 5/145* (2013.01)

(58) Field of Classification Search
CPC ........ G01B 11/007; G01B 7/046; G01B 7/30; G01R 33/09
USPC ............ 324/207.11, 13, 16, 21, 23, 220, 649, 324/662, 251, 244
See application file for complete search history.

(56) References Cited

U.S. PATENT DOCUMENTS

| | | | |
|---|---|---|---|
| 4,785,242 A | 11/1988 | Vaidya et al. | |
| 5,558,091 A * | 9/1996 | Acker et al. | 600/424 |
| 6,894,487 B2 * | 5/2005 | Kunz-Vizenetz | 324/207.25 |
| 6,965,227 B2 | 11/2005 | Blossfeld | |
| 7,096,593 B2 | 8/2006 | Schmied | |
| 7,307,414 B2 | 12/2007 | Ito | |
| 7,420,363 B2 | 9/2008 | Hatanaka et al. | |
| 2008/0044119 A1 | 2/2008 | Aoki et al. | |
| 2009/0309585 A1 * | 12/2009 | Iijima et al. | 324/207.25 |
| 2010/0097059 A1 | 4/2010 | Estrada et al. | |
| 2011/0187351 A1 * | 8/2011 | Hunger | 324/207.2 |
| 2011/0291650 A1 | 12/2011 | Franke et al. | |
| 2012/0095712 A1 | 4/2012 | Komasaki et al. | |
| 2012/0194175 A1 * | 8/2012 | Ausserlechner | 324/207.14 |
| 2012/0262157 A1 | 10/2012 | Liebart | |

(Continued)

FOREIGN PATENT DOCUMENTS

| | | |
|---|---|---|
| DE | 103 34 869 B3 | 9/2004 |
| DE | 103 49 556 A1 | 6/2005 |
| DE | 10 2004 010 948 A1 | 10/2005 |

(Continued)

OTHER PUBLICATIONS

Joachim Quasdorf, "Auflösung von Winkelmessungemerhöhen," Elektronik Praxis, vol. 18, pp. 22-26 (Sep. 17, 2008).

*Primary Examiner* — Tung X Nguyen
*Assistant Examiner* — Neel Shah
(74) *Attorney, Agent, or Firm* — Muncy, Geissler, Olds & Lowe, P.C.

(57) ABSTRACT

A measuring system having a first magnetic field sensor, an encoder, and an evaluation circuit. The first magnetic field sensor and the second magnetic field sensor and the third magnetic field sensor are connected to the encoder. The evaluation circuit has a logic, which is set up to determine the position of the encoder based on a first measurement signal of a first magnetic field sensor and a second measurement signal of a second magnetic field sensor and a third measurement signal of a third magnetic field sensor.

17 Claims, 6 Drawing Sheets

(56) References Cited

U.S. PATENT DOCUMENTS

2013/0027028 A1* 1/2013 Hohe et al. .............. 324/207.11
2013/0221956 A1 8/2013 Kotani et al.

FOREIGN PATENT DOCUMENTS

| | | |
|---|---|---|
| DE | 10 2005 049 312 A1 | 4/2007 |
| DE | 10 2007 009 585 A1 | 9/2007 |
| DE | 10 2007 022 196 A1 | 11/2007 |
| DE | 10 2008 059 401 A | 6/2010 |
| DE | 10 2010 003 292 A1 | 9/2011 |
| DE | 10 2010 019 508 A1 | 11/2011 |
| EP | 1 111 392 A1 | 6/2001 |
| EP | 1 477 772 A1 | 11/2004 |
| EP | 1 503 182 B1 | 12/2008 |
| EP | 2 339 299 A2 | 6/2011 |
| EP | 2 354 769 A1 | 8/2011 |
| JP | 2003-194901 A | 7/2003 |
| WO | WO 2012/060216 A1 | 5/2012 |
| WO | WO 2013/050535 A2 | 4/2013 |

* cited by examiner

MEASURING SYSTEM

This nonprovisional application claims priority under 35 U.S.C. §119(a) to German Patent Application No. DE 10 2013 000 430.6, which was filed in Germany on Jan. 14, 2013, and which is herein incorporated by reference.

BACKGROUND OF THE INVENTION

1. Field of the Invention

The present invention relates to a measuring system.

2. Description of the Background Art

EP 2 354 769 A1, which corresponds to US 20110187351, which is incorporated herein by reference, discloses an angle sensor and a method for determining an angle between a sensor system and a magnetic field. The angle sensor has a magnetic field-generating magnet, which is adjustable with regard to a rotation axis in different rotational positions relative to the sensor system. The sensor system has a first magnetic field sensor for detecting a first magnetic field component, oriented transversely to the rotation axis, and a second magnetic field sensor for detecting a second magnetic field component, situated transversely to plane extending from the rotation axis and the first magnetic field component. The sensor system has a third magnetic field sensor for detecting a third magnetic field component oriented in the direction of the rotation axis.

DE 10 2008 059 401 A1, which corresponds to US 20110291650, which is incorporated herein by reference, discloses a semiconductor chip and a method for generating pulse edges, assigned synchronously to the movement of a mechanical part. A magnetic field is generated and at least two measuring signals for the magnetic field are detected. The magnetic field is changed as a function of the movement of the mechanical part in such a way that the measurement signals are modulated phase-shifted to one another. A first measurement signal is compared with a first reference value. A second measurement signal is compared with a second reference value. The value of the first measurement signal is compared with the value of the second measurement signal. A pulse edge is generated when at least one of these comparisons produces an agreement or the result of the relevant comparison changes its sign.

EP 1 111 392 A1, which corresponds to U.S. Pat. No. 6,965,227, which is incorporated herein by reference, discloses a detection of the rotational speed and angular position of a rotating wheel with an adjustable switching threshold for drift compensation. The detection of the rotational speed and angular position of a wheel occurs by means of a non-contact sensor which scans the wheel and generates a pulse train. The amplitude of the pulse is compared in a comparator with a variable switching threshold. The switching threshold is adjusted so that the value of the difference between the pulse amplitude and the switching threshold does not exceed a predefinable maximum value.

An optical nonius system is known from ELEKTRONIK PRAXIS, No. 18, 17 Sep. 2008, page 22, by J. Quasdorf. The interpolation of analog sine signals is an evaluation function in the case of position sensors. It is possible with a special method to evaluate a number of measurement scales and to combine them to form a position value. Measuring systems are possible thereby that offer a high integral accuracy or very high resolutions with good differential precision. A small optical sensor is sufficient for the scanning.

An angle rotation sensor is known from EP 1 503 182 B1, which corresponds to U.S. Pat. No. 6,894,487. The rotation angle sensor has a rotary shaft, a magnet coupled to the rotary shaft, and a magnet-sensitive sensor element. The sensor element generates a sinusoidal and a cosinusoidal output signal as a function of the relative rotation angle between the magnet and the sensor. The rotation angle sensor has an evaluation unit, which generates a signal corresponding to the rotation angle from the output signals. In addition, the shaft is movably guided linearly parallel to its axis along a guide track during its rotation around its axis, so that the distance between the magnet and sensor changes according to a pitch of the guide track. The evaluation unit determines from the output signals of the sensor element a signal from which the distance between the sensor element and the magnet and thereby the number of full rotations of the shaft can be determined. A fine signal within a full rotation is determined from the sinusoidal and cosinusoidal output signals and this fine signal is added to the value of the full rotation multiplied by 360°.

SUMMARY OF THE INVENTION

Against this background, it is an object of the present invention to provide a measuring system that refines the state of the art.

Accordingly, a measuring system is provided with a magnetic field sensor array and an encoder and an evaluation circuit.

The magnetic field sensor array can have a first magnetic field sensor, integrated into a semiconductor chip, for measuring a first component of a magnetic field vector in a first spatial direction and a second magnetic field sensor, integrated into a semiconductor chip, for measuring a second component of the magnetic field vector in a second spatial direction, and a third magnetic field sensor, integrated into a semiconductor chip, for measuring a third component of the magnetic field vector in a third spatial direction. The first spatial direction and the second spatial direction and the third spatial direction are perpendicular to one another.

The encoder can be designed to change the magnetic field vector in the first spatial direction and in the second spatial direction and in the third spatial direction, as a function of its rotatory and/or translational movement relative to the magnetic field sensor array.

The change, caused by the movement of the encoder, in the magnetic field vector has a first periodicity in the first spatial direction and in the second spatial direction.

The change, caused by the movement of the encoder, in the magnetic field vector has a second periodicity in the third spatial direction.

A first period of the first periodicity and a second period of the second periodicity are different.

The first magnetic field sensor and the second magnetic field sensor and the third magnetic field sensor are connected to the evaluation circuit.

The evaluation circuit is set up to determine the position of the encoder based on a first measurement signal of the first magnetic field sensor and a second measurement signal of the second magnetic field sensor and a third measurement signal of the third magnetic field sensor.

Many advantages are achieved by specific implementations according to the exemplary embodiments in the figures according to the previously elucidated inventive concept. Although only a single integrated magnetic field sensor array is used, different requirements can be met, which typically can be achieved only with a plurality of separate sensors. Thus, both a high-resolution measurement with, for example, a plurality of pole pairs and a determination of the absolute position with the plurality of pole pairs are achieved in that the modulation of the third component of the magnetic field vector in the third spatial direction can be evaluated in addition. Accordingly, simple encoders can be realized which modulate the component in the third spatial direction.

According to an embodiment, the second periodicity can be greater than the first periodicity. If, for example, a magnetic wheel is used, the period of the second periodicity corresponds, for example, to a rotation of the magnetic wheel. If the encoder is bar-shaped, in contrast, a linear movement along a track can be determined, whereby a period of the second periodicity corresponds to a stretch between the endpoints of the track.

It is provided in an embodiment that the encoder can have a number of magnets and/or a number of coils to generate the magnetic field vector.

In a further, likewise combinable refinement, the magnetic field sensor array has a number of magnets and/or a number of coils to generate the magnetic field vector.

According to an embodiment, the rotationally movable encoder can have a plurality of first magnets and a number of second magnets. The plurality of first magnets with each rotation of the encoder by means of a plurality of pole pairs generates the rotation angle-dependent first magnetic field change with the first periodicity in the magnetic field sensor array in the first spatial direction and second spatial direction. The number of second magnets with each rotation of the encoder generates the rotation angle-dependent second magnetic field change with the second periodicity in the magnetic field sensor array in the third spatial direction.

It is provided in a further embodiment that the encoder, movable along a track, has a plurality of first magnets and a number of second magnets. The track extends, for example, along a straight line. It is also possible that the track has one or more curvatures.

The plurality of first magnets with a movement of the encoder along the track by means of a plurality of pole pairs generates the path-dependent first magnetic field change with the first periodicity in the magnetic field sensor array in the first spatial direction and in the second spatial direction.

The number of second magnets with the movement of the encoder along the track generates the path-dependent second magnetic field change with the second periodicity in the magnetic field sensor array in the third spatial direction.

According to a further embodiment, the rotationally movable encoder has a plurality of teeth. A material of the teeth influences a magnetic field of a magnet of the magnetic field sensor array. The teeth of the encoder are designed with each rotation of the encoder to generate the rotation angle-dependent first magnetic field change of the magnetic field vector in the magnetic field sensor array with the first periodicity in the first spatial direction and second spatial direction. The encoder is designed with each rotation to generate the rotation angle-dependent second magnetic field change with the second periodicity in the magnetic field sensor array in the third spatial direction.

In a further embodiment, the encoder, movable along a track, has a plurality of teeth. A material of the teeth influences a magnetic field of a magnet of the magnetic field sensor array. The teeth of the encoder are designed, during movement of the encoder along the track, to generate the path-dependent first magnetic field change with the first periodicity in the magnetic field sensor array in the first spatial direction and the second spatial direction. The encoder is designed to generate the path-dependent second magnetic field change with the second periodicity in the magnetic field sensor array in the third spatial direction along the track.

According to an embodiment, the evaluation circuit is set up to generate the first signal with the first periodicity from the first measurement signal and the second measurement signal according to a first function. The first function can be an arctangent function:

$$D=\arctan(A/B) \tag{1}$$

In this case, D is the first signal, A is the first measurement signal, and B is the second measurement signal.

The evaluation circuit can be set up to generate a second signal with the second periodicity from the third measurement signal of the third magnetic field sensor according to a second function.

The second function can be for example:

$$E=\sqrt{(A^2+B^2+C^2)} \tag{2}$$

In this case, E is the second signal, A is the first measurement signal, and B is the second measurement signal, and C is the third measurement signal. The aforementioned second function can be used especially advantageously, when an amplitude modulation occurs in at least the third spatial direction.

The previously described refinement variants are especially advantageous both individually and in combination. In this regard, all refinement variants can be combined with one another. Some possible combinations are explained in the description of the exemplary embodiments shown in the figures. These possible combinations of the variants, depicted therein, are not definitive, however.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
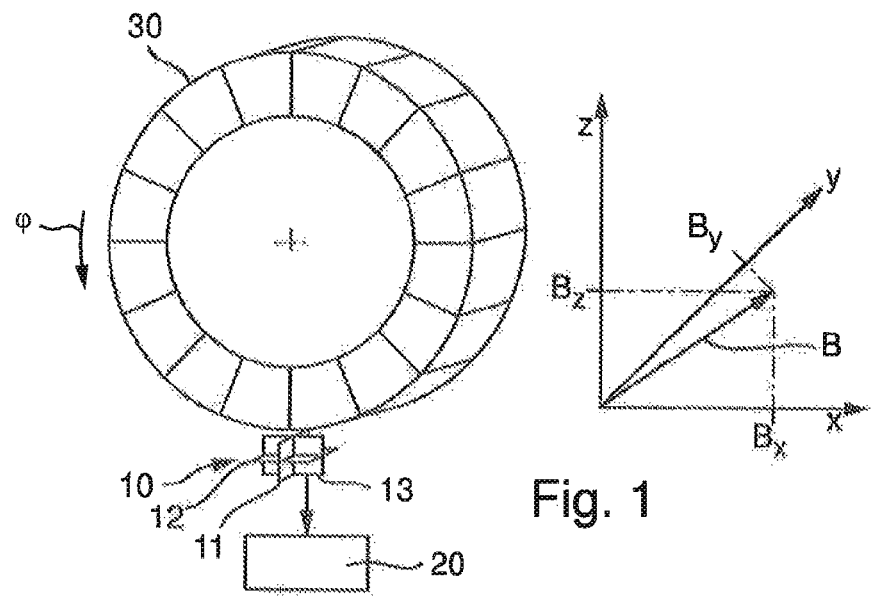
FIG. 1 shows a schematic illustration of an exemplary embodiment of a measuring system.

A measuring system is illustrated schematically in FIG. 1. The measuring system has a magnetic field sensor array 10, an evaluation circuit 20, and an encoder 30. Encoder 30 is movable rotationally and/or translationally relative to magnetic field sensor array 10. The position and/or movement of encoder 30 are to be detected by means of the measuring system. Basically, a magnetic wheel or a magnetic bar with a plurality of pole pairs can be used as encoder 30. The magnetic wheel allows the angle measurement of a rotation. The magnetic bar allows a path measurement. The magnetic bar need not necessarily be straight; a magnetic bar curved according to requirements also permits nonlinear path measurements.

Magnetic field sensor array 10 has a first magnetic field sensor 11 and a second magnetic field sensor 12 and a third magnetic field sensor 13, which are integrated in precisely one semiconductor chip. Magnetic field sensors 11, 12, 13 are arranged for measuring components $B_x$, $B_z$, $B_y$ of a magnetic field vector B. A coordinate system with the spatial directions x, y, and z is shown schematically in FIG. 1. The origin of the coordinate system occurs in the middle of magnetic field sensor array 10, but is shown slightly offset in FIG. 1 for better visibility.

First magnetic field sensor 11 is arranged for measuring a first component $B_x$ of magnetic field vector B in a first spatial direction x. Second magnetic field sensor 12 is arranged for measuring a second component $B_z$ of magnetic field vector B in a second spatial direction z. Third magnetic field sensor 13 is arranged for measuring a third component $B_y$ of magnetic field vector B in a third spatial direction. Magnetic field sensors 11, 12, 13 are, for example, Hall plates, which are integrated into the semiconductor chip at right angles to one another.

Encoder 30 in the exemplary embodiment of FIG. 1 is designed to change magnetic field vector B in all three spatial directions x, y, z as a function of its rotatory movement.

Figure 2:
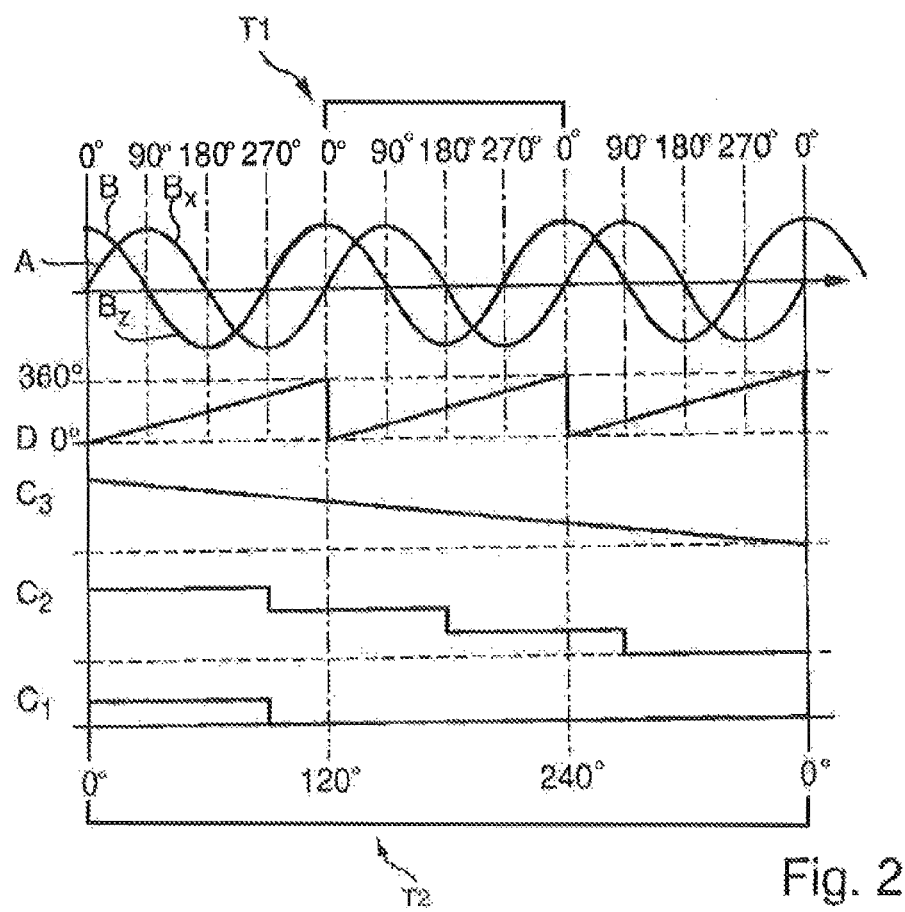
FIG. 2 shows a schematic diagram of an exemplary embodiment.

It is shown schematically in a diagram in FIG. 2 that the movement of encoder 30 causes a change in magnetic field vector B in the first spatial direction x (shown by the first magnetic field component $B_x$) and in the second spatial direction z (shown by the second magnetic field component $B_z$) with a first periodicity $T_1$.

It is likewise shown in FIG. 2 that the movement of encoder 30 causes a change in magnetic field vector B in the third spatial direction y (shown by the measurement signals C1, C2, C3) with a second periodicity $T_2$. A first period of the first periodicity $T_1$ and a second period of the second periodicity $T_2$ are different. In the exemplary embodiment of FIG. 2, the second period is three times as long as the first period. With regard to the exemplary embodiment of FIG. 1, the second period of the second periodicity $T_2$ is, for example, equal to a rotation of encoder 30. In contrast, the small first period of the first periodicity $T_1$ enables an especially high resolution of the rotation angle φ.

Figure 3:
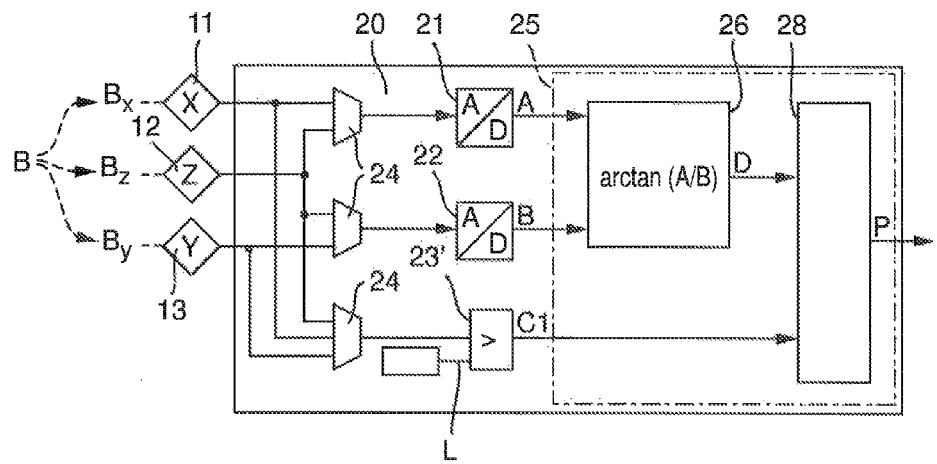
FIG. 3 shows a block circuit diagram of an exemplary embodiment of an evaluation circuit.
Figure 4:
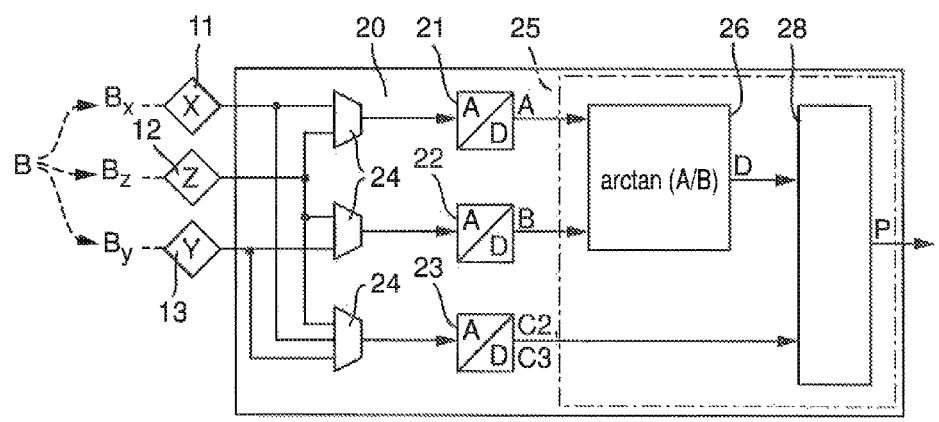
FIG. 4 shows a block circuit diagram of a further exemplary embodiment of an evaluation circuit.
Figure 5:
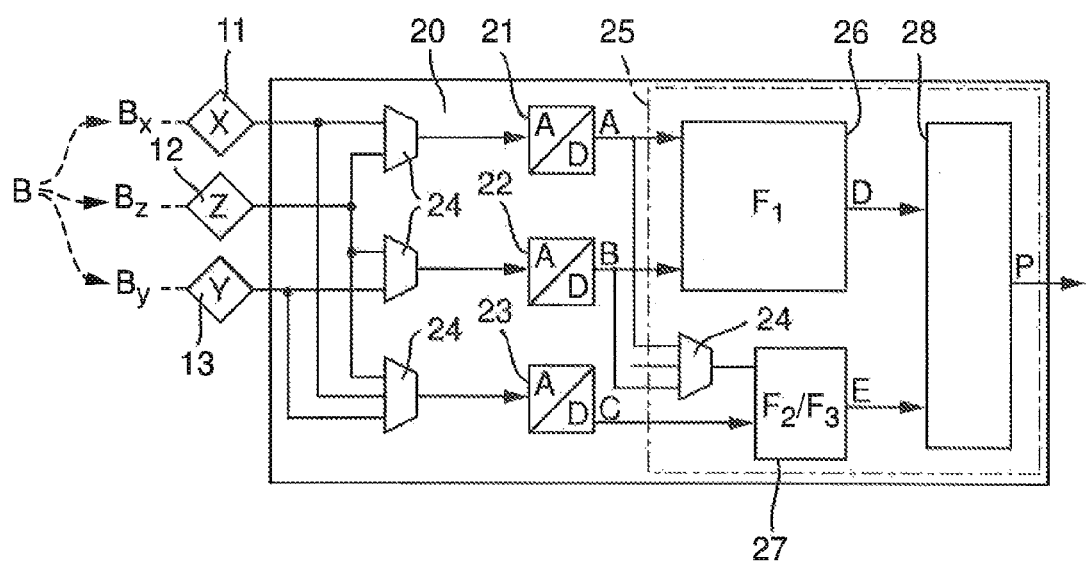
FIG. 5 shows a block circuit diagram of a further exemplary embodiment of an evaluation circuit.

Exemplary embodiments for evaluation circuit 20 are shown schematically as a block circuit diagram in FIGS. 3, 4, and 5. In the exemplary embodiments of FIGS. 3, 4, and 5, first magnetic field sensor 11 and second magnetic field sensor 12 and third magnetic field sensor 13 are connected to evaluation circuit 20.

Evaluation circuit 20 of the exemplary embodiment of FIG. 3 has a number of analog-to-digital converters 21, 22, 23'. An analog input of an analog-to-digital converter 21, 22, 23' can be connected in each case by means of a multiplexer 24 to one of the connected magnetic field sensors 11, 12, 13. The switch position of multiplexers 24 is assumed hereinafter for the case that first magnetic field sensor 11 is connected to first analog-to-digital converter 21, second magnetic field sensor 12 to second analog-to-digital converter 22, and third magnetic field sensor 13 to third analog-to-digital converter 23'. Depending on the orientation of magnetic field sensor array 10 in space, a different connection can also be switched by multiplexers 24, so that there is a high flexibility in the spatial arrangement of the magnetic field sensor array 10.

Alternatively to the exemplary embodiment of FIG. 3, an analog-to-digital converter can be provided for each magnetic field sensor 11, 12, 13. In this case, the signals on the digital side would be selected and multiplexers 24 could be omitted. Alternatively, a single fast analog-to-digital converter could also be used, and the analog signals of magnetic field sensors 11, 12, 13 are switched in rapid succession cyclically to the input of the single analog-to-digital converter by means of a multiplexer.

In the exemplary embodiment of FIG. 3, first analog-to-digital converter 21 outputs the digital measurement signal A, second analog-to-digital converter 22 the digital measurement signal B, and third analog-to-digital converter 23' the digital measurement signal C1. The third analog-to-digital converter 23' in this case is made as a comparator and outputs only one bit as measurement signal C1. The third analog-to-digital converter 23' is therefore formed by precisely one threshold switch.

Evaluation circuit 20 of FIG. 3 is set up to determine the position of encoder 30 based on the first measurement signal A of first magnetic field sensor 11 and the second measurement signal B of second magnetic field sensor 12 and the third measurement signal C1 of third magnetic field sensor 13 and to output it as position signal P. For example, the position signal P contains a value for each degree of the angle φ according to FIG. 1. The evaluation circuit 20 has a logic 25 to determine the position. In FIGS. 3, 4, and 5 the functions of logic 25 are shown schematically as function blocks 26, 27, 28. Logic 25 can be realized by hard-wired hardware or by a programmable processor and software corresponding to the function.

The first measurement signal A and the second measurement signal B represent, for example, the fundamental frequency, therefore a magnetic rotation or a pole pair. The third measurement signal C1 allows the differentiation of a number of rotations or pole pairs within a mechanical rotation. Function block 26 describes an arctangent function of the measurement signals A and B:

$$D = \arctan(A/B) \quad (3)$$

The first signal D therefore enables an especially fine resolution of the position within a pole pair of encoder 30. Logic 25 is set up by means of function block 28 to form the position signal P from the first signal D and the third measurement signal C1. Function block 28 is, for example, a counting logic, an algorithm, and/or a table (LUT—Look Up Table).

The course of the third measurement signal C1 is shown schematically in FIG. 2. Accordingly, the analog output signal of third magnetic field sensor 13 within the first period of the first/second measurement signal A, B exceeds the threshold L. Proceeding from this initialization, the further periods of the first/second measurement signal A, B can be counted and the position signal P determined from the counted value of the count and the first signal D. The threshold L is advantageously adjustable, particularly programmable.

In FIG. 4, an evaluation circuit 20 of a further exemplary embodiment is shown schematically based on a block circuit diagram. The third analog-to-digital converter 23 in FIG. 4 enables a higher-resolution digital measurement signal C2, C3. In this case, the third analog-to-digital converter 23 has a lower resolution than the first analog-to-digital converter 21 and second analog-to-digital converter 22.

In FIG. 2, two different third measurement signals C2, C3 are shown in the diagram. The measurement signal C2 has four values of a step function, by which the three periods of the first/second measurement signal A, B can be reliably differentiated. A high noise immunity and a high signal distance are achieved by the step function. The drift with temperature and aging of the magnets of the encoder with respect to components $B_x$, $B_z$ of magnetic field vector B do not need to be compensated. A compensation for the component by can be provided. The measurement signal C3 has a higher resolution, so that a predominantly linearly decreasing function can be evaluated. Moreover, other steps and resolutions are also possible by means of third analog-to-digital converter 23. For example, the third measurement signal is a sine signal with a smaller periodicity. The use of a nonius track is also possible here.

A further exemplary embodiment of an evaluation circuit 20 is shown in FIG. 5 as a block circuit diagram. An additional function block 27 makes it possible to use a second function F2 and optionally a third function F3, in addition to first function F1. Function block 27 outputs the evaluation result as signal E, which together with signal D is evaluated by function block 28 and the position signal P is output. The first measurement signal A and/or the second measurement signal B can be applied optionally on the input side to function block 27 by multiplexer 24. The exemplary embodiment of FIG. 5 therefore makes possible an evaluation of more complex changes in magnetic field vector B, as is described in the exemplary embodiments of FIGS. 6 to 10b.

In an exemplary embodiment, the first function F1 is for example:

$$F1(B_x,B_z)=\arctan(B/A) \quad (4)$$

The second function F2 is for example:

$$F2(B_y,B_z)=\arctan(B/C) \quad (5)$$

In this exemplary embodiment, the advantage of an improved noise immunity and improved signal distance is achieved. The temperature response and aging of $B_x$, $B_y$, $B_z$ need not be absolutely compensated.

In a further exemplary embodiment, the first function F1 is for example:

$$F1(B_x,B_z)=\arctan(B/A) \quad (6)$$

The second function F2 is for example:

$$F2(B_x,B_y,B_z)=\sqrt{(A^2+B^2+C^2)} \quad (7)$$

Accordingly, in this exemplary embodiment, an angle value and a magnitude value are determined with each measurement.

In an exemplary embodiment with the evaluation by means of the three functions F1, F2, and F3, the following applies for F1:

$$F1(B_x,B_z)=\arctan(B/A) \quad (8)$$

The second function F2 is for example:

$$F2(B_y,B_z)=\arctan(B/C) \quad (9)$$

In addition, the third function F3 is for example:

$$F2(B_x,B_y,B_z)=\sqrt{(A^2+B^2+C^2)} \quad (10)$$

In a further exemplary embodiment, the measurement signals A, B, C are evaluated by means of further functions F1, F2, F3:

$$F1(B_x,B_z)=\arctan(B/A) \quad (11)$$

$$F2(B_x,B_z)=\sqrt{(A^2+B^2)} \quad (12)$$

$$F3(B_y)=C \quad (13)$$

Accordingly, an angle, a magnitude, and the modulation in the y-direction are evaluated separately.

Figure 6:
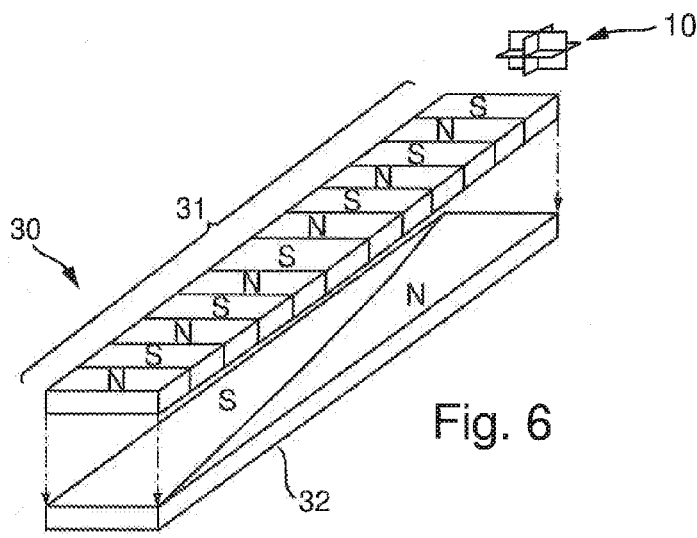
FIG. 6 shows a schematic illustration of an exemplary embodiment of an encoder.
Figure 7:
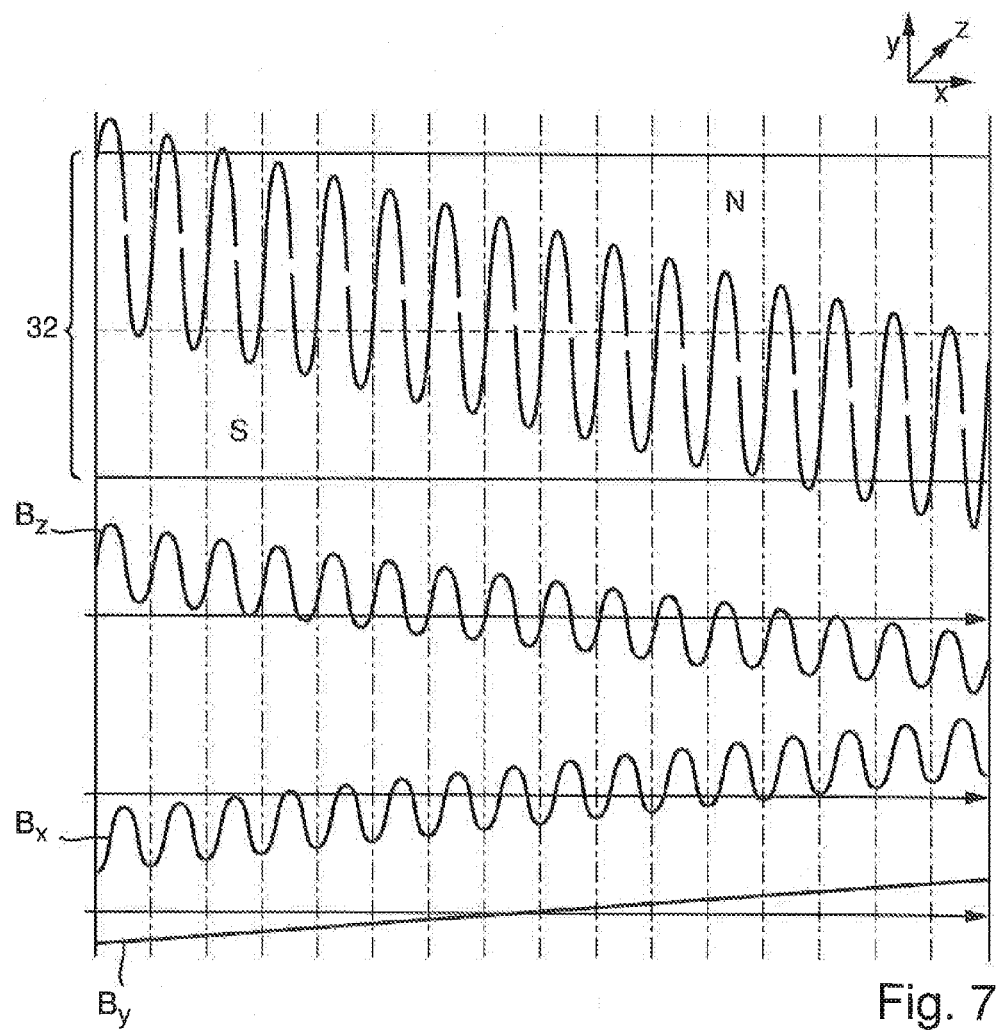
FIG. 7 shows a schematic diagram of a further exemplary embodiment.

FIGS. 6 and 7 show a further exemplary embodiment with an encoder 30, which has a number of first magnets 31 and precisely one second magnet 32. As shown in FIG. 6, first magnets 31 and second magnets 32 are arranged spatially close to one another. For example, first magnets 31 are glued to second magnets 32. The resulting components $B_x$, $B_y$, $B_z$ of magnetic field vector B is shown schematically in FIG. 7 as a function of a movement of magnetic field sensor array 10 along encoder 30.

Figure 8A:
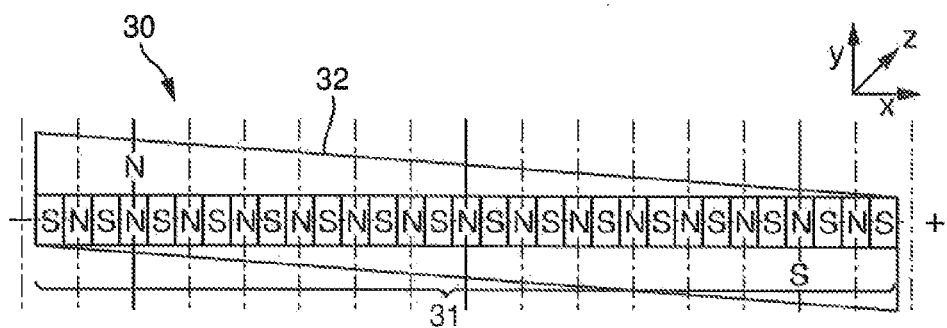
FIG. 8a shows a schematic illustration of a further exemplary embodiment of an encoder.
Figure 8B:
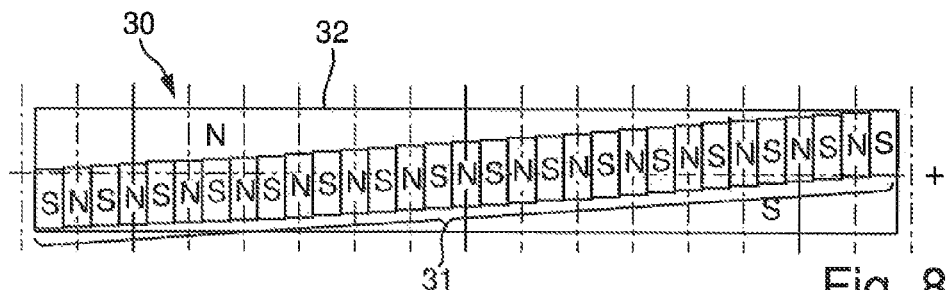
FIG. 8b shows a schematic illustration of a further exemplary embodiment of an encoder.
Figure 8C:
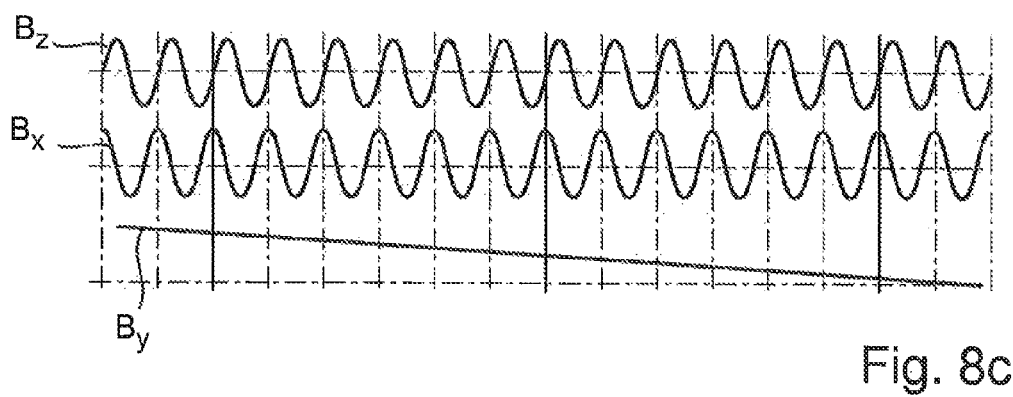
FIG. 8c shows a schematic diagram of a further exemplary embodiment.

Other exemplary embodiments of measuring systems are shown schematically in FIGS. 8a and 8b. In both exemplary embodiments, encoder 30 has first magnets 31 and precisely one second magnet 32. First and second magnets 31, 32 are arranged offset transversely to the direction of movement (x-direction) in order to modulate the y-component $B_y$ of magnetic field vector B along the movement path. The changes in the components $B_x$, $B_y$, $B_z$, of magnetic field vector B are shown schematically in FIG. 8c.

Figure 9A:
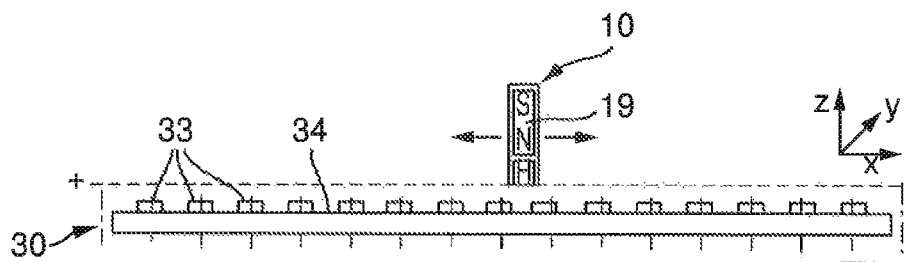
FIGS. 9a and 9b show schematic illustrations of an exemplary embodiment of an encoder.

FIG. 9a shows a further exemplary embodiment of a measuring system. The modulation of magnetic field vector B in the third spatial direction z can also occur by means of a back-bias magnet 19, which is placed behind magnetic field sensors 11, 12, 13. To this end, encoder 30 has a suitably shaped metal wheel or shaped metal bar. In this case, encoder 30 or magnetic field sensor array 10 or both can be moved. In the exemplary embodiment of FIG. 9a, encoder 30 has teeth 33. Teeth 33 have a material which influences a magnetic field of back-bias magnet 19. Back-bias magnet 19 moves together with magnetic field sensors 11, 12, 13 relative to the structure of encoder 30. The structure can bend the magnetic field in that the structure has, e.g., iron. In this way, path-dependent measurement signals can be generated in magnetic field sensor array 10. Nevertheless, in this case there is no zero-crossing by components $B_x$, $B_y$, $B_z$ of magnetic field vector B, as is shown schematically in FIG. 9c.

Figure 9B:
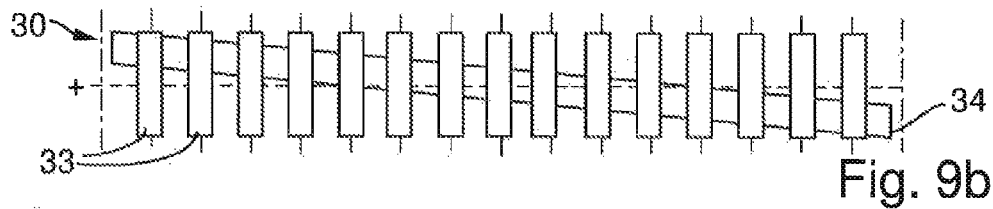
Figure 9C:
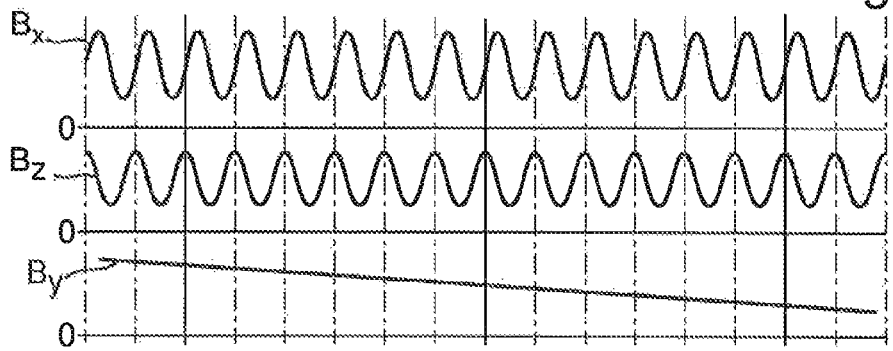
FIG. 9c shows a schematic diagram for the exemplary embodiments of FIGS. 9a and 9b.

Teeth 33 of encoder 30 in FIGS. 9a and 9b are designed during movement of encoder 30 along a track relative to magnetic field sensor array 10 to generate the path-dependent first magnetic field change with a first periodicity in magnetic field sensor array 10 in the first spatial direction x and the second spatial direction z. This relative movement from encoder 30 to magnetic field sensor array 10 makes it possible, for example, to position encoder 30 fixed relative to the housing and to mount magnetic field sensor array 10 movable relative to the housing. A high resolution is achieved by the path-dependent first magnetic field change with the first periodicity. Thus, even small movements along the track can be determined.

In addition, encoder 30 is designed to generate the path-dependent second magnetic field change with a second periodicity in magnetic field sensor array 10 in the third spatial direction y along the track. It is illustrated in this regard in FIG. 9b that a metal element 34, e.g., made of iron, is arranged below teeth 33 and shifts the magnetic field of back-bias magnet 19 in the y-direction. Metal element 34 can therefore also be called a shifting element or displacement element. The shape of shifting element 34 in this case changes in the y-direction depending on the direction of movement, in the x-direction in the exemplary embodiment of FIG. 9b. Alternatively to the exemplary embodiment of FIGS. 9a and 9b, back-bias magnet 19 can have a different orientation.

Figure 10A:
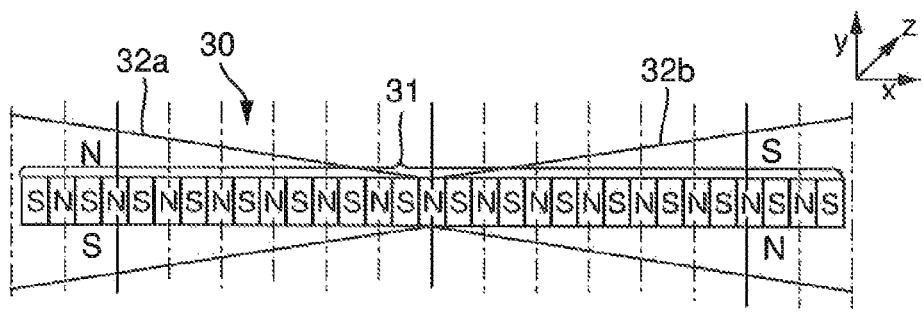
FIG. 10a shows a schematic illustration of a further exemplary embodiment of an encoder.
Figure 10B:
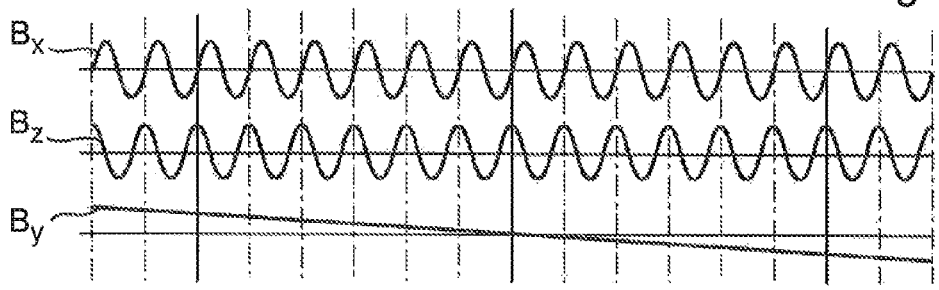
FIG. 10b shows a schematic diagram of an exemplary embodiment.

A further exemplary embodiment of a measuring system is shown schematically in FIGS. 10a and 10b. Encoder 30 has a number of first magnets 31 and a number of second magnets 32a and 32b. First magnets 31 generate a sinusoidal magnetic field in the x-z plane at a suitable distance during movement. Two magnetic field sensors offset by 90° enable the detection of the x-component $B_x$ and the z-component $B_z$ of the field. The angle is calculated according to the arctangent function from the associated measurement signals.

A modulation of the magnetic field in the y-direction is generated by the lateral magnetic pole of second magnets 32a, 32b. An additional field component $B_y$, which makes it possible to differentiate a number of pole pairs of first magnets 31, can be generated thereby in the y-direction. A continuous, ramp-like course is indicated in the exemplary embodiment of FIG. 10b. A suitable second magnet could also generate a y-component $B_y$ which changes in a step-like manner. In an exemplary embodiment different from FIGS. 10a and 10b, it is also possible to form the second magnets as a nonius track, e.g.:

$$F1(B_x, B_z) = \sin(10/10) \qquad (14)$$

$$F2(B_y) = \sin(9/10) \qquad (15)$$

The invention is not limited to the shown embodiment variants of FIGS. 1 to 10b. For example, it is possible to use a different arrangement of the magnets. It is also possible that both encoder 30 and magnetic field sensor array 10 each have a number of magnets. The functionality of the measuring system according to FIG. 1 can be used especially advantageously for an adjustment system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring system comprising:
a magnetic field sensor array that has a first magnetic field sensor integrated into a semiconductor chip for measuring a first component of a magnetic field vector in a first spatial direction, a second magnetic field sensor integrated into the semiconductor chip for measuring a second component of the magnetic field vector in a second spatial direction, and a third magnetic field sensor integrated into the semiconductor chip for measuring a third component of the magnetic field vector in a third spatial direction, wherein the first spatial direction, the second spatial direction and the third spatial direction are all orthogonal to each other;
an encoder configured to change the magnetic field vector in the first spatial direction and in the second spatial direction and in the third spatial direction as a function of a rotatory and/or translational movement, wherein the change in the first spatial direction and in the second spatial direction, caused by the movement of the encoder in the magnetic field vector, has a first periodicity, wherein the change, caused by the movement of the encoder in the magnetic field vector in the third spatial direction, has a second periodicity, wherein a first period of the first periodicity and a second period of the second periodicity are different; and
an evaluation circuit to which the first magnetic field sensor and the second magnetic field sensor and the third magnetic field sensor are connectable, the evaluation circuit being adapted to determine a position of the encoder based on a first measurement signal of the first magnetic field sensor and a second measurement signal of the second magnetic field sensor and a third measurement signal of the third magnetic field sensor.

2. The measuring system according to claim 1, wherein the encoder has a plurality of magnets and/or a plurality of coils to generate the magnetic field vector.

3. The measuring system according to claim 2, wherein the rotationally movable encoder has a plurality of first magnets and a plurality of second magnets,
wherein the plurality of first magnets with each rotation of the encoder via a plurality of pole pairs generates the first magnetic field change with the first periodicity in the magnetic field sensor array in the first spatial direction and the second spatial direction, and wherein the plurality of second magnets with each rotation of the encoder generates the second magnetic field change with the second periodicity in the magnetic field sensor array in the third spatial direction.

4. The measuring system according to claim 2, wherein the encoder is movable along a track relative to the magnetic field sensor array, and has a plurality of first magnets and a plurality of second magnets, wherein the plurality of first magnets with a movement of the encoder along the track via a plurality of pole pairs generates the first magnetic field change with the first periodicity in the magnetic field sensor array in the first spatial direction and in the second spatial direction, and wherein the plurality of second magnets with the movement of the encoder along the track generates the second magnetic field change with the second periodicity in the magnetic field sensor array in the third spatial direction.

5. The measuring system according to claim 1, wherein the magnetic field sensor array has a plurality of magnets and/or a plurality of coils to generate the magnetic field vector.

6. The measuring system according to claim 5, wherein the rotationally movable encoder has a plurality of teeth, wherein a material of the teeth influences a magnetic field of a magnet of the magnetic field sensor array, wherein the teeth of the encoder are designed with each rotation of the encoder to generate the first magnetic field change of the magnetic field vector in the magnetic field sensor array with the first periodicity in the first spatial direction and second spatial direction, and wherein the encoder is designed with each rotation to generate the second magnetic field change with the second periodicity in the magnetic field sensor array in the third spatial direction.

7. The measuring system according to claim 5, wherein the encoder, movable along a track relative to the magnetic field sensor array, has a plurality of teeth, wherein a material of the teeth influences a magnetic field of a magnet of the magnetic field sensor array, wherein the teeth of the encoder are designed, during movement of the encoder along the track, to generate the first magnetic field change with the first periodicity in the magnetic field sensor array in the first spatial direction and the second spatial direction, and wherein the encoder is designed to generate the second magnetic field change with the second periodicity in the magnetic field sensor array in the third spatial direction along the track.

8. The measuring system according to claim 1, wherein the evaluation circuit is set up to generate the first signal with the first periodicity from the first measurement signal and the second measurement signal according to a first function, particularly an arctangent function.

9. The measuring system according to claim 1, wherein the evaluation circuit is set up to generate a second signal with the second periodicity from the third measurement signal of the third magnetic field sensor according to a second function.

10. The measuring system according to claim 1, wherein the first period and the second period are measured as a function of the rotatory and/or translational movement.

11. The measuring system according to claim 10, wherein the second period corresponds to a single rotation of the encoder.

12. The measuring system according to claim 10 wherein the second period is three times the first period.

13. The measuring system according to claim 1, wherein the first magnetic field sensor, the second magnetic field sensor and the third magnetic field sensor are disposed in the magnetic field sensor array at right angles to each other.

14. The measuring system according to claim 1, wherein after one period equal to the first period, the first component of a magnetic field vector and second component of a magnetic field vector are replaced with a counter.

15. A measuring system comprising: a magnetic field sensor array integrated into a semiconductor chip including a first magnetic field sensor for measuring a first spatial component of a magnetic field vector, a second magnetic field sensor for measuring a second spatial component of the magnetic field vector, and a third magnetic field sensor for measuring a third spatial component of the magnetic field vector, wherein the first spatial component, the second spatial component and the third spatial component are all orthogonal to each other; an encoder configured to change the first spatial component, the second spatial component and the third spatial component of the magnetic field vector as a function of a rotatory or translational movement, wherein the change in the first spatial component and in the second spatial component has a first periodicity, wherein the change in the third spatial component has a second periodicity, wherein a first period of the first periodicity and a second period of the second periodicity are different; and an evaluation circuit connected to the first magnetic field sensor and the second magnetic field sensor and the third magnetic field sensor, the evaluation circuit determining a position of the encoder based on a first spatial component measurement from the first magnetic field sensor and a second spatial component measurement from the second magnetic field sensor and a third spatial component measurement from the third magnetic field sensor.

16. The measuring system according to claim 13, wherein the evaluation circuit calculates at least one intermediate variable based on the first spatial component measurement and the second spatial component measurement of the magnetic field vector.

17. The measuring system according to claim 14, wherein the evaluation circuit determines the position of the encoder based on an arctangent of the first spatial component measurement and the second spatial component measurement of the magnetic field vector, and the at least one intermediate variable.

* * * * *